US010042417B2

(12) United States Patent
Hickey et al.

(10) Patent No.: US 10,042,417 B2
(45) Date of Patent: *Aug. 7, 2018

(54) BRANCH PREDICTION WITH POWER USAGE PREDICTION AND CONTROL

(71) Applicant: International Business Machines Corporation, Armonk, NY (US)

(72) Inventors: Mark J. Hickey, Rochester, MN (US); Adam J. Muff, Issaquah, WA (US); Matthew R. Tubbs, Issaquah, WA (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/202,556

(22) Filed: Jul. 5, 2016

(65) Prior Publication Data

US 2016/0313788 A1    Oct. 27, 2016

Related U.S. Application Data

(63) Continuation of application No. 14/841,016, filed on Aug. 31, 2015, which is a continuation of application No. 13/762,621, filed on Feb. 8, 2013, now Pat. No. 9,395,804.

(51) Int. Cl.
| | | |
|---|---|---|
| *G06F 15/00* | (2006.01) | |
| *G06F 7/38* | (2006.01) | |
| *G06F 9/00* | (2006.01) | |
| *G06F 9/44* | (2018.01) | |
| *G06F 1/32* | (2006.01) | |
| *G06F 9/38* | (2018.01) | |
| *G06F 9/30* | (2018.01) | |

(52) U.S. Cl.
CPC .............. *G06F 1/3296* (2013.01); *G06F 1/32* (2013.01); *G06F 1/324* (2013.01); *G06F 1/3206* (2013.01); *G06F 1/329* (2013.01); *G06F 1/3287* (2013.01); *G06F 9/30083* (2013.01); *G06F 9/3836* (2013.01); *G06F 9/3844* (2013.01)

(58) Field of Classification Search
None
See application file for complete search history.

(56) References Cited

U.S. PATENT DOCUMENTS

| | | | |
|---|---|---|---|
| 5,740,417 A | 4/1998 | Kennedy et al. | |
| 6,055,273 A | 4/2000 | Isomura | |
| 6,282,663 B1 | 8/2001 | Khazam | |

(Continued)

OTHER PUBLICATIONS

U.S. Patent and Trademark Office, Office Action issued in related U.S. Appl. No. 13/762,621 dated Jul. 16, 2015.

(Continued)

*Primary Examiner* — George Giroux
(74) *Attorney, Agent, or Firm* — Middleton Reutlinger

(57) ABSTRACT

A circuit arrangement maintains power usage prediction information for one or more functional units in branch prediction logic for a processing unit such that the power consumption of a functional unit may be selectively reduced in association with the execution of branch instructions when it is predicted that the functional unit will be idle subsequent to the execution of such branch instructions.

19 Claims, 6 Drawing Sheets

(56) References Cited

U.S. PATENT DOCUMENTS

| | | |
|---|---|---|
| 6,678,815 B1 | 1/2004 | Mathews et al. |
| 6,976,182 B1 | 12/2005 | Filippo |
| 7,134,028 B2 | 11/2006 | Bose et al. |
| 7,340,628 B2 | 3/2008 | Pessolano |
| 7,681,021 B2 | 3/2010 | Schuler et al. |
| 7,966,479 B1 | 6/2011 | Thaik et al. |
| 7,979,725 B2 | 7/2011 | Atkinson |
| 8,028,180 B2 | 9/2011 | Bonanno et al. |
| 2004/0117606 A1 | 6/2004 | Wang et al. |
| 2010/0228955 A1 | 9/2010 | Niggemeier et al. |
| 2011/0161627 A1* | 6/2011 | Song .................... G06F 1/3203 712/30 |

OTHER PUBLICATIONS

U.S. Patent and Trademark Office, Final Office Action issued in related U.S. Appl. No. 13/762,621 dated Jan. 21, 2016.
U.S. Patent and Trademark Office, Notice of Allowance issued in related U.S. Appl. No. 13/762,621 dated Apr. 22, 2016.
U.S. Patent and Trademark Office, Office Action issued in related U.S. Appl. No. 14/841,016 dated Sep. 12, 2017.

* cited by examiner

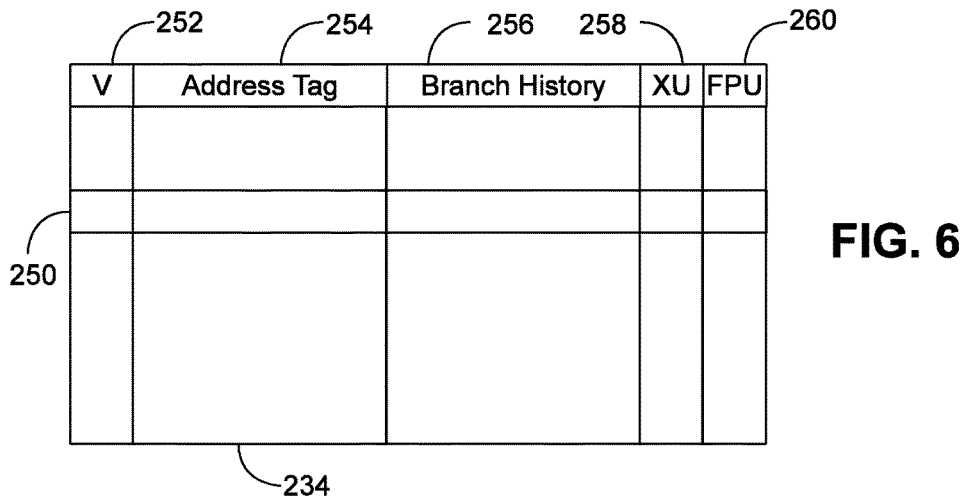
FIG. 6
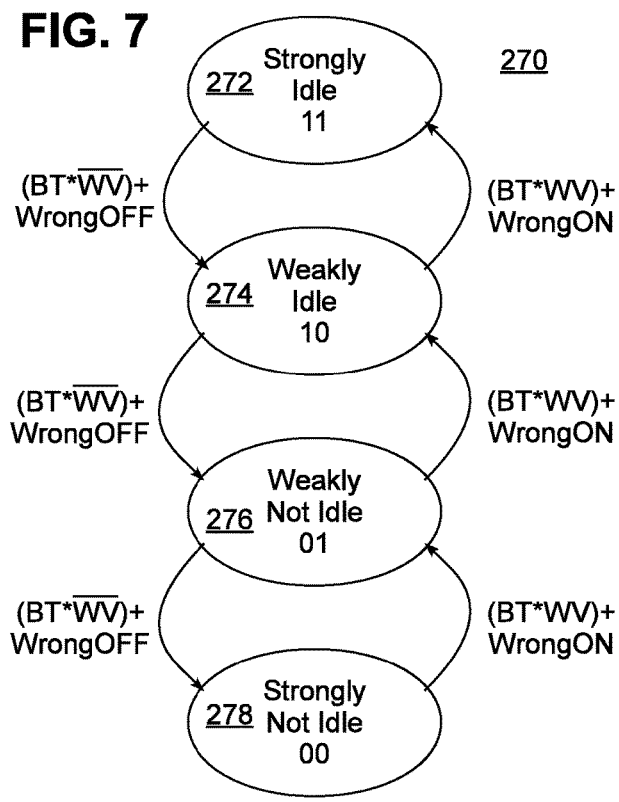
FIG. 7
| State | Power |
|-------|-------|
| SI    | Voff  |
| WI    | Gated |
| WNI   | ON    |
| SNI   | ON    |
FIG. 8

BRANCH PREDICTION WITH POWER USAGE PREDICTION AND CONTROL

FIELD OF THE INVENTION

The invention is generally related to data processing, and in particular to processor architectures and controlling power consumption of such architectures.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

These various techniques for improving execution unit performance, however, do not come without a cost. Parallelism adds complexity, often requiring a greater number of logic gates, which increases both the size and the power consumption of such execution units. Coupling these techniques with the general desire to increase performance through other techniques, such as increased switching frequency, the power consumption of complex, high performance execution units continues to increase, despite efforts to reduce such power consumption through process improvements. Excessive power consumption can present issues for portable or battery powered devices, but more typically, excessive power consumption presents issues for nearly all electronic circuits due to the generation of heat, which often requires elaborate cooling systems to ensure that a circuit does not overheat and fail.

Chip-wide control over power consumption is often used in electronic circuits such as those used in laptop computers or other portable devices, typically by throttling down the clock rate or frequency of the circuit to reduce power consumption and the generation of heat. In addition, power consumption may also be reduced in some instances by temporarily shutting down unused circuits on a chip, including, for example, entire execution units. In all of these instances, however, throttling back the power consumption of the circuit usually results in lower performance in the chip. Furthermore, the circuit characteristics that define the overall power consumption of such circuits, e.g., cycle time, voltage, logic area, capacitance, etc., are most often designed to meet a maximum performance target.

In some designs, for example, a special purpose register may be used to control clock gating to a particular execution unit. Software is therefore capable of effectively enabling or disabling execution units by setting or clearing a flag in the special purpose register. One drawback of this approach, however, is that it is software-controlled, and it is thus incumbent on a developer or compiler to properly configure an application to enable and disable an execution unit at appropriate times. Furthermore, if only a rare occasional instruction for a particular execution unit is needed the execution unit will typically need to remain enabled throughout, thereby limiting the amount of power savings that may be achieved.

Therefore, a continuing need exists in the art for improved manners of reducing power consumption in a chip.

SUMMARY OF THE INVENTION

The invention addresses these and other problems associated with the prior art by providing a circuit arrangement that maintains power usage prediction information for one or more functional units in branch prediction logic for a processing unit such that the power consumption of a functional unit may be selectively reduced in association with the execution of branch instructions when it is predicted that the functional unit will be idle subsequent to the execution of such branch instructions. By doing so, the power consumption of portions of a chip may be predictively reduced, and typically in an automated fashion and independent of any software control.

Therefore, consistent with one aspect of the invention, a method of controlling power consumption in a processing unit of the type including a plurality of functional units includes maintaining, in branch prediction logic coupled to the processing unit, historical information associated with a plurality of branch instructions, where the historical information for a first branch instruction among the plurality of branch instructions further includes power usage prediction information associated with a first functional unit among the plurality of functional units, and selectively reducing power consumption of the first functional unit in association with execution of the first branch instruction based upon the power usage prediction information maintained by the branch prediction logic.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a block diagram of an example implementation of the branch history table referenced in FIG. 5.

FIG. 7 is a state diagram of an example implementation of a state machine used by the branch prediction logic of FIG. 5.

FIG. 8 is a table illustrating power control states for the power control logic referenced in FIG. 5.

DETAILED DESCRIPTION

Embodiments consistent with the invention utilize power usage prediction information maintained for one or more functional units by branch prediction logic for a processing unit to selectively reduce the power consumption of a functional unit when it is predicted that the functional unit will be idle subsequent to the execution of such a branch instruction. The power usage prediction information provides a prediction of whether, subsequent to a particular branch instruction is executed, the associated functional unit is expected to be idle for a reasonable period of time thereafter (i.e., that none of the instructions that are predicted to be executed after the branch instruction will require the use of the functional unit). Thus, by doing so, the power states of functional units may be predictively controlled based upon the anticipated instruction streams being executed by a processing unit, and thereby reducing overall power consumption in the processing unit with reduced impact on performance.

The power consumption of a functional unit may be decreased in any of a number of manners known in the art, e.g., clock gating or powering off (e.g., by decreasing the voltage of a voltage island for the functional unit). In addition, the power consumption may be decreased without completely disabling the functional unit, but merely by reducing performance/power consumption, e.g., by reducing clock rate or disabling one or more components in a functional unit (e.g., disabling multithreading, disabling one or more lanes in a vector execution unit, etc.).

A functional unit, in this regard, may include an execution unit such as a fixed point execution unit (XU), a floating point execution unit (FPU), an auxiliary execution unit (AXU), or various types of accelerators or specialized execution units (e.g., encryption/decryption engines, DMA engines, compression/decompression engines, physics engines, graphics processors, coprocessors, etc.). In addition, a functional unit may include types of processor logic other than execution units or accelerators, e.g., message passing logic, memory management logic (e.g., an MMU), address translation logic (e.g., an ERAT), etc.

Other variations and modifications will be apparent to one of ordinary skill in the art. Therefore, the invention is not limited to the specific implementations discussed herein.

Hardware and Software Environment

Figure 1:
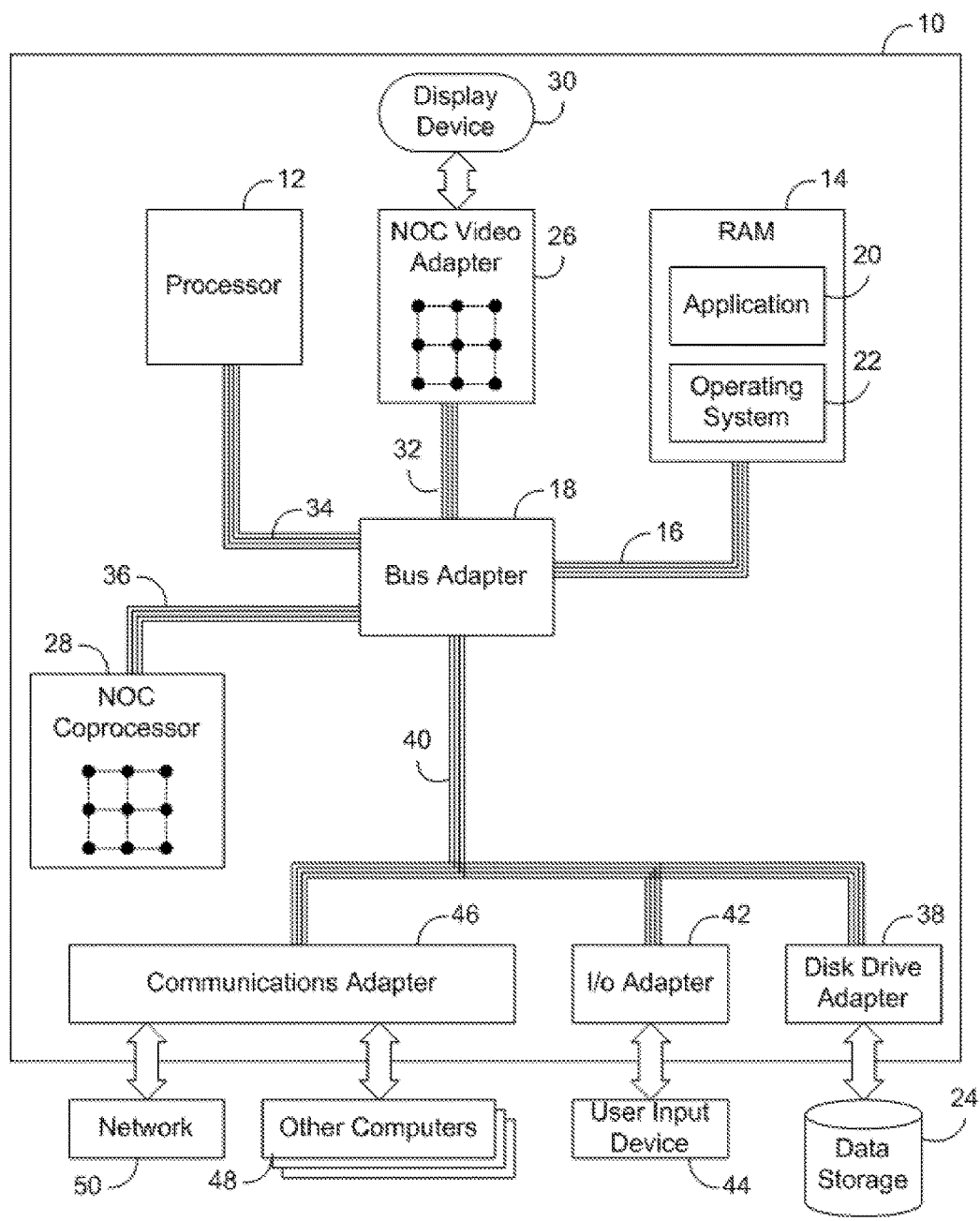
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
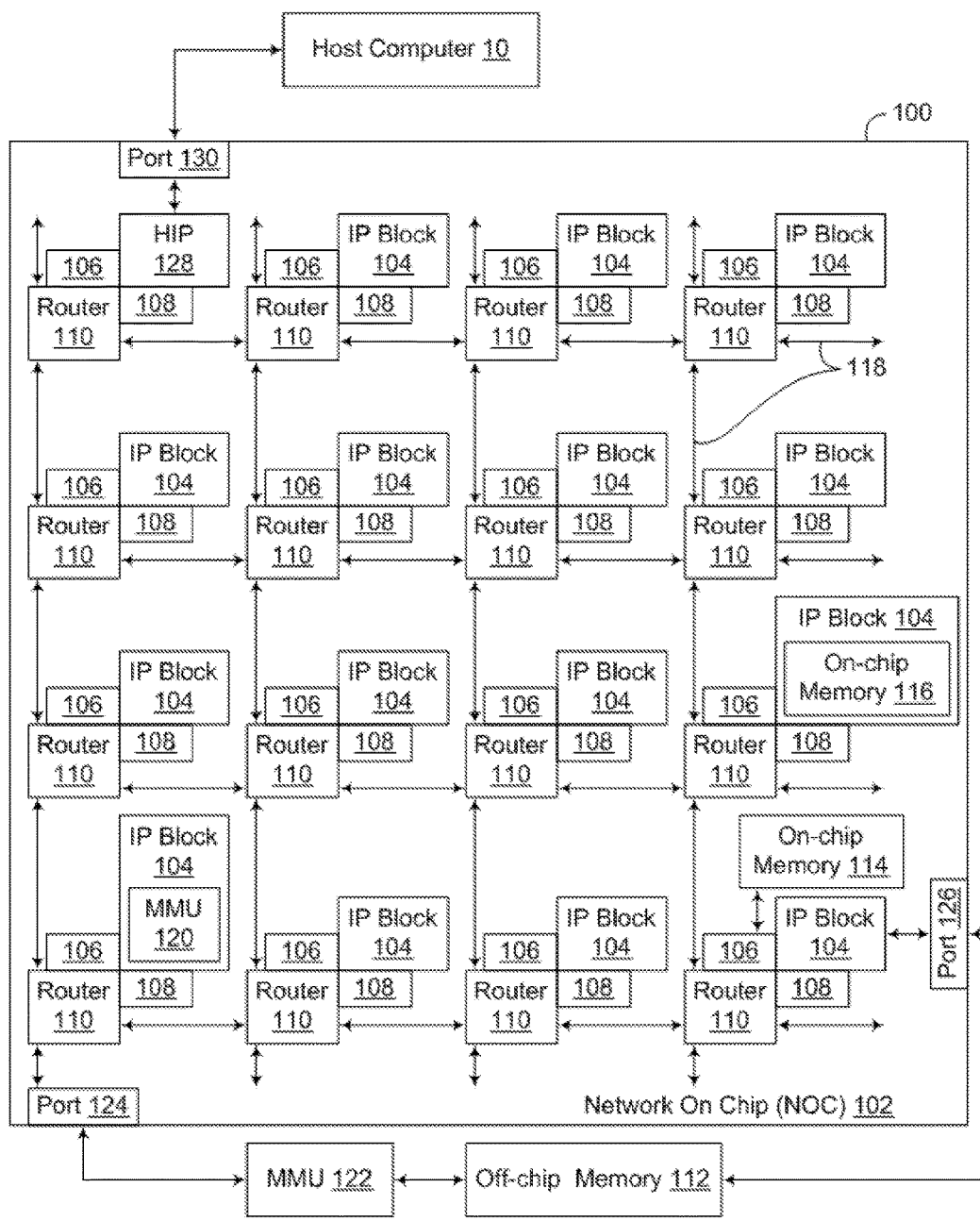
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may be used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
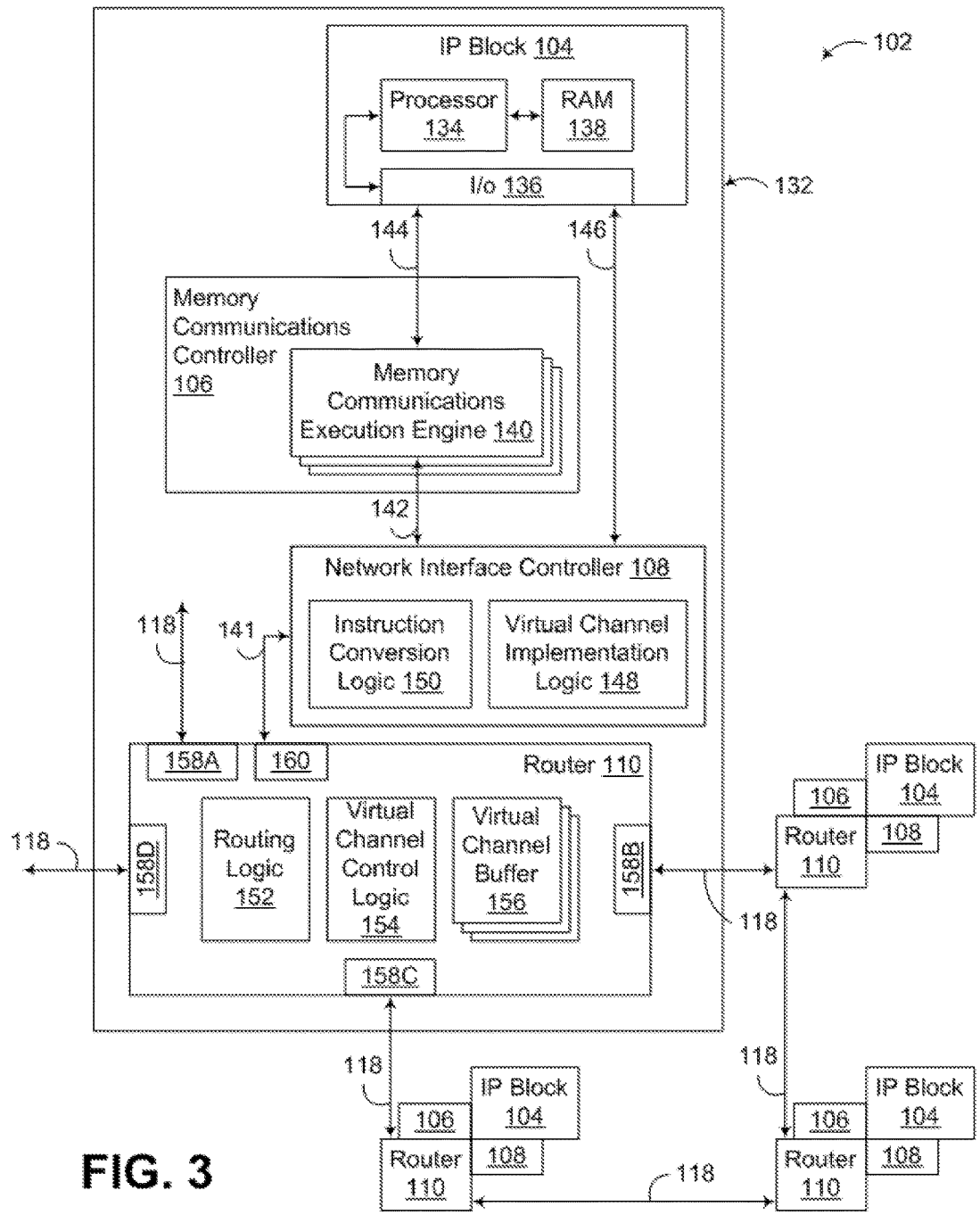
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
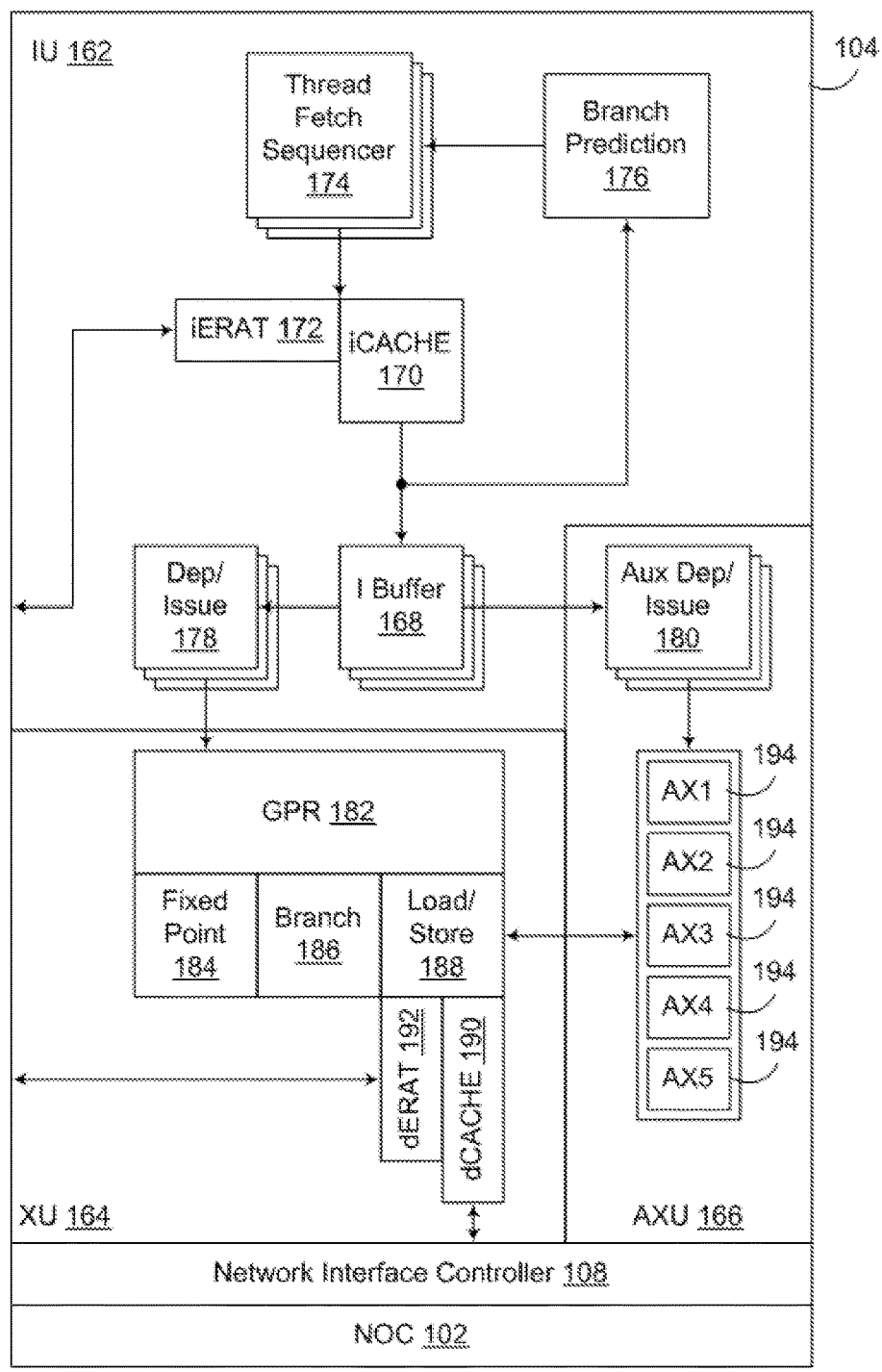
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Branch Prediction with Power Usage Prediction and Control

Reducing the power consumption of microprocessors and other processing units is a very much in demand objective. Conventionally, to minimize power consumption, many microprocessors incorporate clock gating, which typically shuts off the clock to unused circuits/execution units. This reduces switching, and therefore power consumption. For instance, most Power architecture designs use the MSR[FP] bit to control clock gating to a floating point execution unit.

While clock gating can improve power consumption, a significant limitation exists in that it is software controlled, as either a software developer needs to include instructions to explicitly set or clear the MSR[FP] bit, or a compiler needs to detect appropriate locations in a program to insert such instructions. Further, if only a rare occasional floating point instruction is needed the floating point execution unit typically must remain enabled, which typically doesn't allow for much power savings.

On the other hand, predictive techniques have been applied in other areas to improve microprocessor performance in an automated fashion and without the need for explicit software control. For example, one particular area where advances have been made in processor design is that of branch prediction, which attempts to predict, in advance of execution of a conditional branch instruction, whether or not that branch instruction will branch to a different code path or continue along the same code path based upon the result of some comparison performed in association with the branch instruction. Branch prediction may be used, for example, to prefetch instructions from a cache or lower level memory to reduce the latency of loading and executing those instructions when the branch instruction is finally resolved.

In addition, in highly pipelined architectures, branch prediction may be used to initiate execution of instructions from a predicted branch before a branch instruction is resolved, such that the results of those instructions can be committed as soon as possible after the branch instruction is resolved.

When a branch is correctly predicted, substantial performance gains may be achieved given that very little latency may exist between executing the branch instruction and the instructions that have been predicted for execution after the branch instruction. On the other hand, when a branch is mispredicted, often the pipeline of an execution unit has to be flushed and the state of the processor essentially rewound so that the instructions from the correct path can be executed.

As a result, substantial efforts have been made in the art to improve the accuracy of branch predictions and therefore minimize the frequency of branch mispredicts by branch prediction logic. Many branch prediction logic implementations, for example, rely on historical information, and are based upon the assumption that if a branch was taken the last time a branch instruction was executed, a likelihood exists that the branch will be taken the next time that branch instruction is executed. In many implementations, for example, a branch history table is used to store entries associated with particular branch instructions so that when those branch instructions are encountered, a prediction may be made based upon historical information stored in the associated with such branch instructions.

In the embodiments discussed hereinafter, branch prediction logic is supplemented with additional power usage prediction information that may be used to predict whether one or more functional units in a microprocessor or other processing unit will likely be idle during code paths that follow certain branch instructions. For example, in some embodiments of the invention, branch predictor history table entries may additionally include one or more bits indicating the history of whether a functional unit will likely be idle and could be powered down to reduce overall power consumption in a chip.

For instance, in a microprocessor with a fixed point execution unit and a floating point execution unit, a table entry may include two bits for the floating point execution unit and two bits for the fixed point execution unit. Each execution unit (or its associated decoder in an instruction unit) may include a counter that counts the number of cycles that the execution unit has remained idle, as well as a latch to hold the address, e.g., as maintained by an instruction fetch address register (IFAR), of the last branch instruction. After a fixed number of cycles the counter may trip and send an indication to the branch prediction logic that the associated execution unit could have been powered down all that time, such that the bits in the corresponding entry in the branch predictor history table may be updated. The branch prediction logic's prediction may then be used to reduce power consumption, e.g., by either preemptively clock gating the execution unit or lower the voltage of that execution unit's voltage island if the prediction is strong. In addition, if an instruction is decoded that needs to use the powered down execution unit, this information may also be fed back into the branch prediction logic and used to update the corresponding history table entry.

Figure 5:
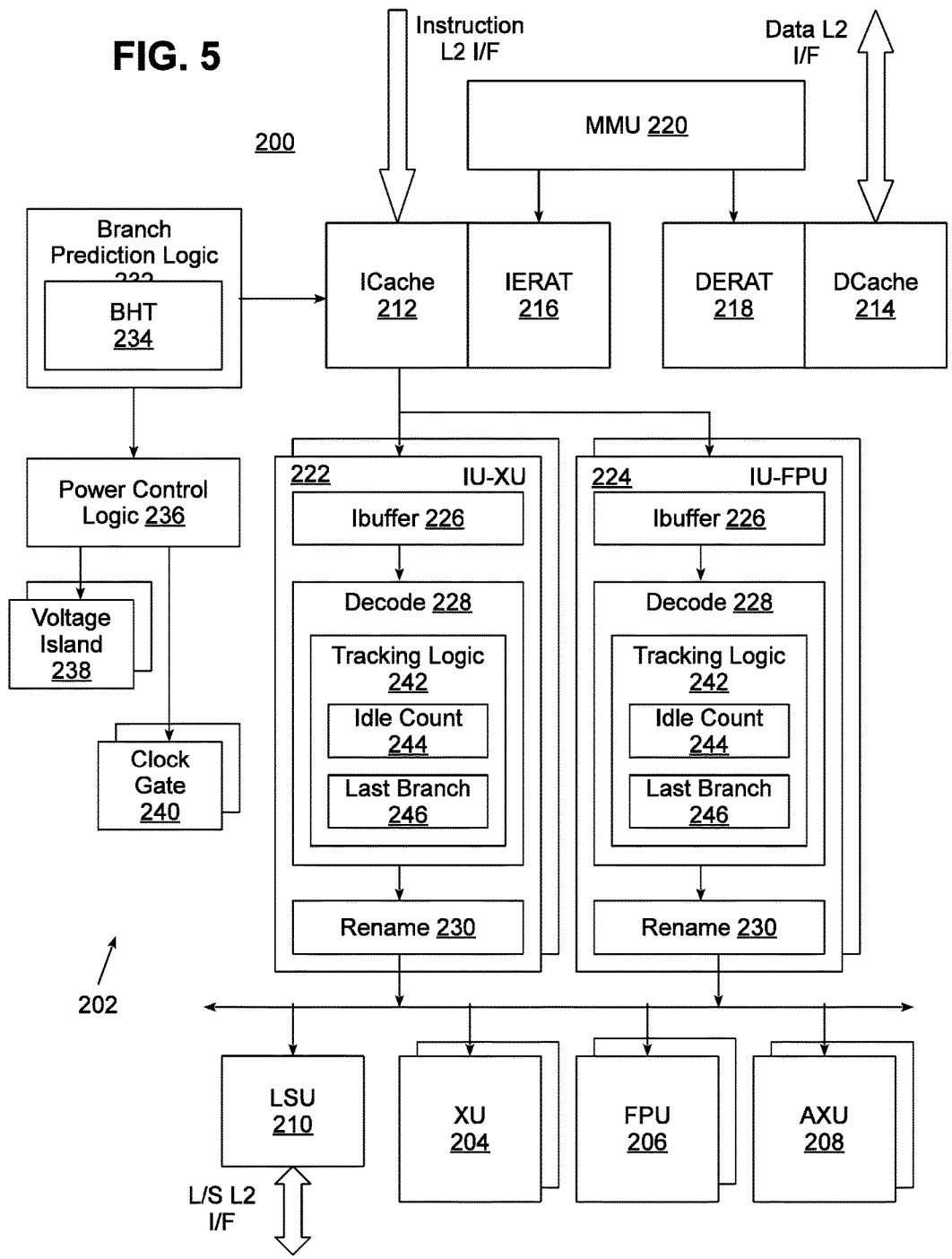
FIG. 5 is a block diagram illustrating an exemplary implementation of an IP block from the NOC of FIG. 2, and configured to implement branch prediction-based power control consistent with the invention.

FIG. 5, for example, illustrates an example processing unit 200, which may be implemented, for example, as an IP block from the computer of FIGS. 1-4. Processing unit 200 includes instruction logic 202 configured to supply instructions to one or more execution units, e.g., one or more fixed point execution units (XU) 204, one or more floating point execution units (FPU) 206, one or more auxiliary execution units (AXU) 208, and a load store unit (LSU) 210. An L1 cache is implemented as separate instruction (ICache) and data (DCache) caches 212, 214, each with a corresponding effective-to-real address translation (ERAT) unit 216, 218. A memory management unit (MMU) controls the interface between the L1 and L2 caches.

Issue logic 202 in the illustrated embodiment is multi-threaded to enable the concurrent execution of multiple instruction streams associated with multiple threads of execution, and as such includes multiple instances 222, 224 of issue logic components used to fetch, decode and issue instructions to the various execution units 204-210.

Instance 222 is used to handle instructions for XU 204, while instance 224 is used to handle instructions for FPU 206, and each includes a dedicated instruction buffer 226, decode logic 228 and rename logic 230. In addition, where multithreading is supported, multiple instances may be used for each execution unit.

Branch prediction logic 232, including a branch history table 234, is used to maintain historical information for a plurality of branch instructions and predict a code path to be followed subsequent to execution of such branch instructions. In addition, in order to implement branch prediction-based power control consistent with the invention, branch prediction logic 232 is coupled to power control logic 236, which is coupled to one or more voltage islands 238 for the various execution units 204-210, as well as to one or more clock gates 240 used to gate the clock signals that are provided to the various execution units 204-210.

It will be appreciated that a wide variety of alternate configurations may be utilized to that illustrated in FIG. 5. For example, various alternative issue logic configurations may be used, e.g., where various components or stages are combined for different execution units or threads of execution, rather than being implemented separately, or where additional and/or alternative components or stages are used. Different memory architectures and cache structures may be used in other embodiments, as may different numbers and combinations of execution units. Furthermore, a wide variety of branch prediction logic implementations may be used, including those that utilize a branch history table and those that do not, so long as historical information is maintained in a table or other data structure and used to predict what code path will be followed subsequent to a branch instruction. Alternative power control logic may be used to implement various types of power reduction methodologies.

In general, embodiments consistent with the invention may be utilized in practically any processing unit configuration including multiple execution or other functional units and where branch prediction logic is used to predict whether branch instructions will be taken at least in part based on historical information maintained by the branch prediction logic. Therefore, the invention is not limited to the particular implementations disclosed herein.

In order to implement branch prediction-based power control, branch prediction logic 232 stores in a branch history table (BHT) 234, and in addition to historical information associated with a branch instruction, power usage prediction information that is utilized to predict whether or not a particular functional unit will likely be idle for some period of time (or number of cycles) subsequent to execution of the branch instruction.

In order to generate the prediction, tracking logic, e.g., tracking logic 242 in each instance 222, 224, may be used to monitor the instructions being executed by each execution unit and provide indications to the branch prediction logic of how long a particular execution unit has been idle. In one embodiment, for example, a tracking logic instance 242 may be associated with each execution unit and/or thread, and may include a counter 244 that is incremented each cycle in which the associated execution unit is idle. The tracking logic may also store an address (e.g., an IFAR address) of a last branch instruction in a latch 246, such that the counter 244 counts the number of idle cycles after ever branch instruction. The tracking logic 242 is configured to include a threshold (which may be static or dynamic) representing a number of idle cycles after which the tracking logic sends an indication to the branch prediction logic, along with the address of the last branch in latch 246, so that the branch prediction logic may update the power reduction prediction information for the branch instruction based upon the fact that the associated execution unit was idle after execution of the indicated branch instruction. The tracking logic 242 may also provide an indication to the branch prediction logic whenever an execution unit is not idle after a branch instruction is executed such that verifications of predictions may be performed. It will be appreciated that tracking logic may be implemented in other manners in other embodiments, e.g., within a different stage or component, such as within predecode logic, within an execution unit, within the branch prediction logic, etc.

FIG. 6 illustrates one suitable manner of implementing branch history table 234. In this implementation, branch history table 234 includes a plurality of entries 250, each indexed based on the address of an associated branch instruction, and each including a valid bit 252 that indicates whether or not the entry is valid and an address tag that is used to match the entry with a particular branch instruction. Each entry 250 also includes branch history information 256 that is used to predict whether or not a branch instruction is likely to be taken, or put another way, which code path will likely be taken subsequent to execution of a branch instruction. The branch history information may include, for example, a single bit that predicts whether the branch instruction will or will not be taken, or a multi-bit prediction that additionally indicates the strength of the prediction. It will be appreciated that a wide variety of branch history table implementations, including other types of history information, other manners of indexing branch instructions (e.g., using a hash algorithm, using multi-way set associativity, etc.) may alternatively be used. Therefore, the invention is not limited to the particular branch history table illustrated herein.

To implement branch prediction-based power control, each entry 250 is supplemented with additional power usage prediction information, which in the illustrated embodiment includes a state field associated with each execution unit for which power may be controlled. In this embodiment, for example, both the fixed point execution unit (XU) 204 and the floating point execution unit (FPU) 206 include dedicated state fields 258, 260 respectively indicating the likelihood that the associated execution unit will be idle subsequent to execution of the associated branch instruction.

For example, each state field 258, 260 may include a 2-bit value that maps to one of four states: Strongly Idle (11), where a strong prediction is made that the execution unit will be idle, Weakly Idle (10), where a weak prediction is made that the execution unit will be idle, Weakly Not Idle (01), where a weak prediction is made that the execution unit will not be idle, and Strongly Not Idle (00), where a strong prediction is made that the execution unit will not be idle.

As illustrated in FIG. 7, the four states may be mapped to a state machine 270 having states 272, 274, 276 and 278. In addition, from a power control perspective, the four states represent whether or not power reduction will be applied to the associated execution unit, and if so, what type of power reduction. As shown in FIG. 8, for example, the Strongly Idle (SI) state causes the power control logic 236 (FIG. 5) to reduce the voltage to the voltage island for the associated execution unit, the Weakly Idle (WI) state causes the power control logic to gate the clocks to the associated execution unit, and the Weakly Not Idle (WNI) and Strongly Not Idle (SNI) states do not employ any power reduction. It will be appreciated that shutting off or reducing the voltage to a voltage island typically provides greater power reduction than clock gating, but requires more time/cycles to restore an execution unit to an enabled state, and as such it is desirable to utilize clock gating when the prediction of an execution unit being idle is not as strong.

Returning to FIG. 7, transitions between states occur based upon one or more of four signals. The first, Branch Taken (BT), represents whether or not the branch instruction was correctly predicted. If a mispredict occurs ($\overline{BT}$), no state transition occurs. However, if a correct prediction occurs (BT), a second signal, Window Not Valid (WV), is used to transition to either a state indicating a greater likelihood the execution unit will be idle or a state indicating a lesser likelihood the execution unit will be idle. An asserted Window Not Valid (WV) signal, which is generated by tracking logic 242 (FIG. 5) is indicative of no instruction being processed by the associated execution unit (i.e., the execution unit was idle) over a given window subsequent to the associated branch instruction. A deasserted Window Not Valid signal ($\overline{WV}$) is indicative of at least one instruction being processed by the associated execution unit (i.e., the execution was not idle) over a given window subsequent to the associated branch instruction. Thus, as shown in FIG. 7, whenever a branch instruction is correctly predicted and the execution was idle (BT*$\overline{WV}$), a transition occurs to indicate a higher likelihood of the execution unit being idle, while whenever a branch instruction is correctly predicted and the execution was not idle (BT*WV), a transition occurs to indicate a lower likelihood of the execution unit being idle.

In addition, in some embodiments it may also be desirable to transition between states in response to two additional signals, WrongON and WrongOFF, associated with mispredictions as to the idle state of an execution unit. WrongON is asserted whenever a prediction is made that the execution unit will be on (i.e., not idle), but the execution unit ends up being idle. In response to such a signal (which is logically OR'ed with the (BT*WV) result), a transition occurs to indicate a higher likelihood of the execution unit being idle. WrongOFF is asserted whenever a prediction is made that the execution unit will be off (i.e., idle), but the execution unit ends up not being idle. In response to such a signal (which is logically OR'ed with the (BT*$\overline{WV}$) result), a transition occurs to indicate a lower likelihood of the execution unit being idle.

It will be appreciated that whenever an execution unit is partially or completely disabled as a result of branch prediction-based power control, if the execution unit is needed, some delay may be introduced to enable the execution unit to be re-enabled. In addition, a pipeline flush or state reset may be required.

It will also be appreciated that other types of power usage prediction information may be maintained in the branch prediction logic. For example, an indication of how long or how many cycles an execution unit is predicted to be idle, such that, for example, an execution unit may be power reduced only for a specified window of cycles. Alternatively, power usage prediction information may include information such as an indication of the number of instruction completions or cycles before a functional unit will need to be reenabled or used.

Therefore, in operation, whenever a branch instruction is encountered in an instruction stream and the power usage prediction information for an execution unit indicates that the execution unit is likely to be idle, the power control logic may clock gate the execution unit or reduce the voltage to the voltage island for the execution unit, and assuming that both the branch prediction and the idle prediction are correct, the power consumption of the execution unit will be reduced. Thus, for example, in an instruction stream where a multi-iteration loop is executing a sequence of fixed point instructions, embodiments of the invention may reduce the power consumption of a floating point execution unit during execution of the loop, without requiring any special coding by a developer or any special optimization applied by a compiler.

Various additional modifications may be made to the disclosed embodiments without departing from the spirit and scope of the invention. Therefore, the invention lies in the claims hereinafter appended.

What is claimed is:

1. A circuit arrangement, comprising:
   a processing unit including a fixed point execution and a floating point execution unit;
   branch prediction logic disposed in the processing unit, the branch prediction logic including a branch history table including a plurality of entries, wherein each entry in the branch history table is associated with a branch instruction and includes at least one branch history bit predicting whether the associated branch instruction will be taken, and wherein each entry in the branch history table further includes at least one power usage prediction bit separate from the at least one branch history bit and predicting whether the floating point execution unit is expected to be idle subsequent to execution of the associated branch instruction;
   tracking logic coupled to the branch prediction logic and configured to notify the branch prediction logic of an idle status of the floating point execution unit, the tracking logic including:
     a counter configured to track a number of cycles the floating point execution unit has remained idle; and
     a latch configured to store an address associated with a last branch instruction; and
   control logic coupled to the branch prediction logic and configured to selectively reduce power consumption of the floating point execution unit in association with execution of a first branch instruction based upon the at least one power usage prediction bit in a first entry in the branch prediction table for the first branch instruction.

2. A circuit arrangement, comprising:
   a processing unit including a plurality of functional units;
   branch prediction logic coupled to the processing unit and configured to maintain historical information associated with a plurality of branch instructions, wherein the historical information for a first branch instruction among the plurality of branch instructions includes branch history information for use in predicting whether the first branch instruction is likely to be taken and power usage prediction information associated with a first functional unit among the plurality of functional units and separate from the branch history information, and wherein the branch prediction logic is configured to predict whether the first branch instruction is likely to be taken in association with execution of the first branch instruction using the branch history information; and control logic coupled to the branch prediction logic and configured to selectively reduce power consumption of the first functional unit in association with execution of the first branch instruction based upon the power usage prediction information maintained by the branch prediction logic.

3. The circuit arrangement of claim 2, wherein the control logic is configured to selectively reduce power consumption of the first functional unit by clock gating the first functional unit.

4. The circuit arrangement of claim 2, wherein the control logic is configured to selectively reduce power consumption of the first functional unit by decreasing a voltage of a voltage island for the first functional unit.

5. The circuit arrangement of claim 2, wherein the power usage prediction information for the first branch instruction predicts whether the first functional unit is expected to be idle subsequent to execution of the first branch instruction.

6. The circuit arrangement of claim 5, wherein the power usage prediction information for the first branch instruction includes a state indicator, wherein a first state of the state indicator indicates that the first functional unit is expected to be idle subsequent to execution of the first branch instruction and a second state of the state indicator indicates that the first functional unit is not expected to be idle subsequent to execution of the first branch instruction.

7. The circuit arrangement of claim 6, wherein the first and second states are associated with weak predictions, wherein a third state of the state indicator indicates that the first functional unit is strongly expected to be idle subsequent to execution of the first branch instruction and a fourth state of the state indicator strongly indicates that the first functional unit is not expected to be idle subsequent to execution of the first branch instruction.

8. The circuit arrangement of claim 7, wherein the control logic is configured to:
    transition the state indicator for the first branch instruction from the first state to the second state in response to the first branch instruction being correctly predicted and the first functional unit not being idle;
    transition the state indicator for the first branch instruction from the first state to the third state in response to the first branch instruction being correctly predicted and the first functional unit being idle;
    transition the state indicator for the first branch instruction from the second state to the fourth state in response to the first branch instruction being correctly predicted and the first functional unit not being idle;
    transition the state indicator for the first branch instruction from the second state to the first state in response to the first branch instruction being correctly predicted and the first functional unit being idle.

9. The circuit arrangement of claim 7, wherein the control logic is configured to:
    transition the state indicator for the first branch instruction from the first state to the second state in response to a mispredict that the first functional unit will be idle;
    transition the state indicator for the first branch instruction from the first state to the third state in response to a mispredict that the first functional unit will not be idle;
    transition the state indicator for the first branch instruction from the second state to the fourth state in response to a mispredict that the first functional unit will be idle;
    transition the state indicator for the first branch instruction from the second state to the first state in response to a mispredict that the first functional unit will not be idle.

10. The circuit arrangement of claim 8, wherein the control logic is configured to selectively reduce power consumption of the first functional unit by clock gating the first functional unit when the state indicator is in the first state, and selectively reduce power consumption of the first functional unit by decreasing a voltage of a voltage island for the first functional unit when the state indicator is in the third state.

11. The circuit arrangement of claim 2, wherein the branch prediction logic includes a branch history table including a plurality of entries, wherein a first entry in the branch history table stores the branch history information for the first branch instruction and the power usage prediction information associated with the first functional unit.

12. The circuit arrangement of claim 11, wherein each entry among the plurality of entries includes historical information for an associated branch instruction and power usage prediction information associated with the first functional unit.

13. The circuit arrangement of claim 2, wherein the branch prediction logic is further configured to maintain power usage prediction information associated with a second functional unit among the plurality of functional units, and wherein the control logic is further configured to selectively reduce power consumption of the second functional unit in association with execution of the first branch instruction based upon the power usage prediction information maintained by the branch prediction logic.

14. The circuit arrangement of claim 2, further comprising tracking logic configured to track how long the first functional unit has been idle.

15. The circuit arrangement of claim 14, wherein the tracking logic comprises a counter associated with the first functional unit and configured to track a number of cycles the first functional unit has remained idle, and wherein the tracking logic is configured to notify the branch prediction logic when the counter exceeds a threshold to indicate that the first functional unit has been in an idle state.

16. The circuit arrangement of claim 15, wherein the tracking logic further comprises a latch configured to store an address of a last taken branch instruction.

17. The circuit arrangement of claim 2, wherein the first functional unit is selected from the group consisting of a floating point execution unit, a fixed point execution unit, an auxiliary execution unit, and an accelerator.

18. An integrated circuit device including the circuit arrangement of claim 2.

19. A program product comprising a non-transitory computer readable storage medium and logic definition program code resident on the non-transitory computer readable storage medium and defining the circuit arrangement of claim 2.

* * * * *